(12) United States Patent  
Muraoka et al.

(10) Patent No.: US 7,480,036 B2  
(45) Date of Patent: Jan. 20, 2009

(54) STORED LIGHT INTENSITY MEASUREMENT DEVICE

(75) Inventors: Tatusya Muraoka, Kyoto (JP); Hisataka Mukai, Kyoto (JP)

(73) Assignee: Kyoto Electronics Manufacturing Co., Ltd., Kyoto (JP)

( * ) Notice: Subject to any disclaimer, the term of this patent is extended or adjusted under 35 U.S.C. 154(b) by 52 days.

(21) Appl. No.: 11/641,737

(22) Filed: Dec. 20, 2006

(65) Prior Publication Data

US 2007/0139643 A1    Jun. 21, 2007

(30) Foreign Application Priority Data

Dec. 21, 2005   (JP) .............................. 2005-367685

(51) Int. Cl.
*G01J 1/00*   (2006.01)
*G01J 1/40*   (2006.01)

(52) U.S. Cl. ......................... 356/213; 356/229; 356/234

(58) Field of Classification Search ........................ None
See application file for complete search history.

(56) References Cited

U.S. PATENT DOCUMENTS

| 5,424,006 | A | 6/1995 | Murayama et al. |
| 6,657,712 | B2 * | 12/2003 | Yamaguchi ................. 356/213 |
| 7,297,416 | B2 * | 11/2007 | Lee ............................ 428/690 |

FOREIGN PATENT DOCUMENTS

JP           7-11250 A      1/1995

* cited by examiner

*Primary Examiner*—Michael P Stafira
(74) *Attorney, Agent, or Firm*—Birch, Stewart, Kolasch & Birch, LLP

(57) ABSTRACT

A stored light intensity measurement device capable of measuring an afterglow intensity from a light storing sign in a simple way, even if the light storing sign is provided on walls or risers of stairs in facilities or underground shopping mall. The stored light intensity measurement device comprising the light measuring unit configured o measure afterglow from a part of a light storing section on a light storing sign, and calculation means for calculating an afterglow intensity from the light storing sign based on the measured results.

7 Claims, 12 Drawing Sheets

RECIPROCAL CHARACTERISTICS OF MEASURED INTENSITY OF LIGHT-ENERGY STORING SIGN SAMPLE

STORED LIGHT INTENSITY MEASUREMENT DEVICE

CROSS-REFERENCE TO RELATED APPLICATIONS

The present application claims the benefit of Japanese patent application number 2005-367685, filed in Japan on Dec. 21, 2005, the subject matter of which is hereby incorporated herein by reference.

BACKGROUND OF THE INVENTION (1) Field of the Invention

The present invention relates to a stored light intensity measurement device for measuring afterglow intensity of a light storing sign.

(2) Description of the Related art

When the earthquake or the like causes a power failure at night, a self-generation of electricity type or battery-powered type pilot display light is to light in an underground passage, in a passage in a building, or in the subway yard. However, there are occurrences when the self-generation of electricity does not always work at the earthquake, and the battery-powered pilot display light does not light at the emergency due to failing the maintenance of the battery of the pilot display light.

Therefore, Japanese government promotes an installation of light storing signs, which keep the luminescence in a specific period after the power failure without supplying energy from outside, on a wall and a riser of stairs in the above-mentioned sites. The light storing sign is a sign board made up of synthetic resin, ceramic, or glass, and of which surface is processed by the light storing material and is given a safety sign design with coloring materials.

The light storing material can absorb light such as sunlight or fluorescent light, and store the energy, and release the stored energy as visible light. The light storing sign using the light storing material is visible due to its phosphorescence in dark environment, and it is also visible even when ambient darkness occurs due to the power failure.

The phosphorescence of the light storing sign fades away and becomes invisible with the lapse of time. Recently, in case of strontium aluminate or calcium aluminate that are used as the light storing material, the visible state will last for approximate 10 hours in total darkness. In case of zinc sulfide, the visible state will last only for a few hours.

In order that the sign is useful in darkness, the sign should have necessary luminance after a predetermined time lapsed. Japanese Industrial Standards Z9107 regulates the light storing sign for communicating or displaying for caution, indication or information for evacuation. That is to say, the luminance of the phosphorescence requires 24 mcd/m$^2$ and more after 20 minutes from the light interception.

In order to measure the afterglow intensity of the light storing sign, the luminance meter like the spot-meter is useful, as disclosed in Japanese Patent Unexamined-Publication No. 07-011250A. For instance, the light storing sign is placed in total darkness for hours before the measurement is performed, and then a predetermined illuminance light is irradiated thereon to store the energy of light. After that, the light storing sign is moved again in darkness, and the afterglow intensity of the light storing sign is measured by the luminance meter.

SUMMARY OF THE INVENTION

The above method is available for measuring the afterglow intensity from the storing sign before the sign is installed. However, it is difficult to measure the afterglow intensity after the sign is installed. The sign is placed in the facility or underground shopping mall mostly, and in order to measure the afterglow intensity in such case, the facility or underground must be unilluminated.

The present invention is suggested in view of the above-mentioned subject in the prior art, and has an object to provide an stored light intensity measurement device capable of easily measuring the afterglow intensity from the light storing sign regardless of the environment on which the light storing sign is placed.

In order to achieve the above object, the present invention provides a stored light intensity measurement device comprising: a light measurement unit configured to measure afterglow from a part of light stored section on a light storing sign; and calculation means for calculating an afterglow intensity from the light storing sign based on the measured results.

In accordance with a preferred embodiment, the calculation means calculates the afterglow intensity after a predetermined time lapsed from beginning light interception based on reciprocals of the afterglow intensity measured for a period in the predetermined time lapsed. In employing such configuration, the stored light intensity measurement device can measure the stored light intensity in a short time, and makes it possible to facilitate the maintenance of the light storing sign.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

The embodiments of the present invention are discussed hereinafter in accordance with attached drawings. In the embodiments, the present invention is embodied as a stored light intensity measurement device for measuring the afterglow intensity of light storing signs.

Figure 7:
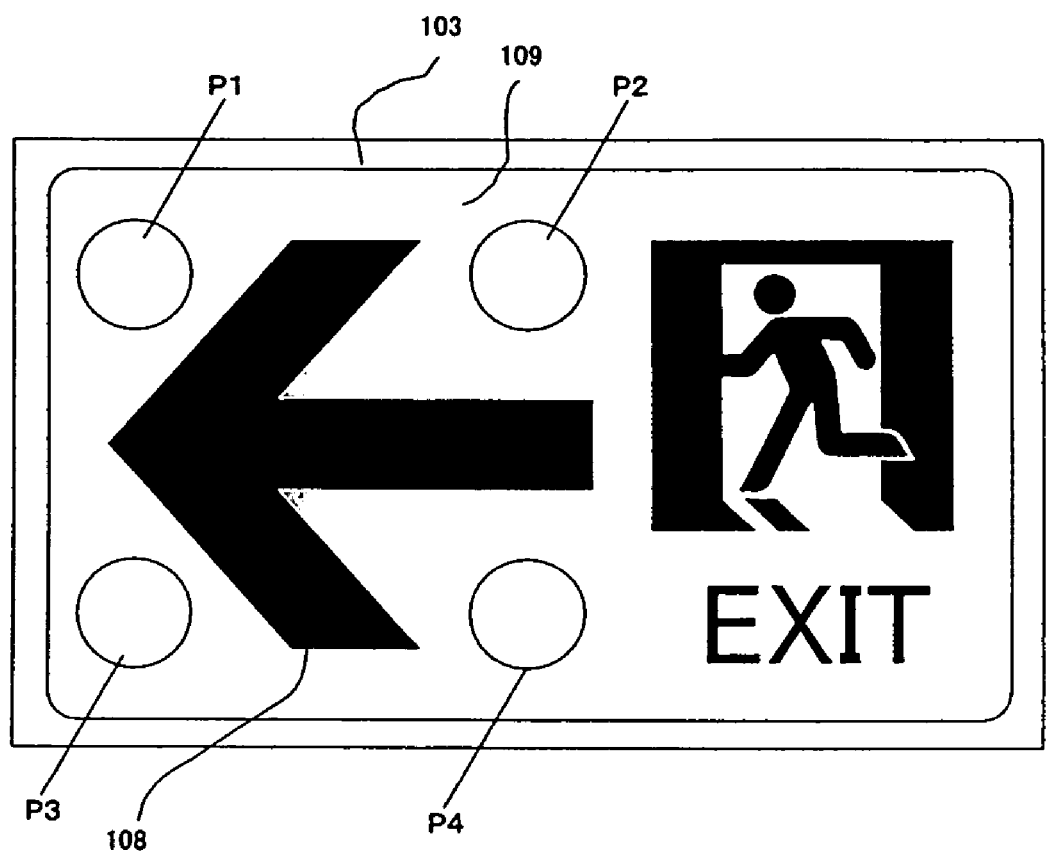
FIG. 7 is a light storing sign according to the embodiment of the present invention.

FIG. 7 shows a light storing sign according to the embodiment of the present invention. The light storing sign 103 is a rectangular plate, on which colored sections 108 painted with colored material and light storing sections 109 applied with light storing material are provided. The colored sections 108 are formed by painting an arrow indicating an evacuation way together with an necessary pictograph, and the light storing sections 109 are sections on which the arrow and the pictograph are not painted. In this embodiment, the device measures afterglow from any part of the light storing section 109. The structure of the device for measuring the afterglow intensity on any part of the light storing sign will be described briefly later.

Figure 1:
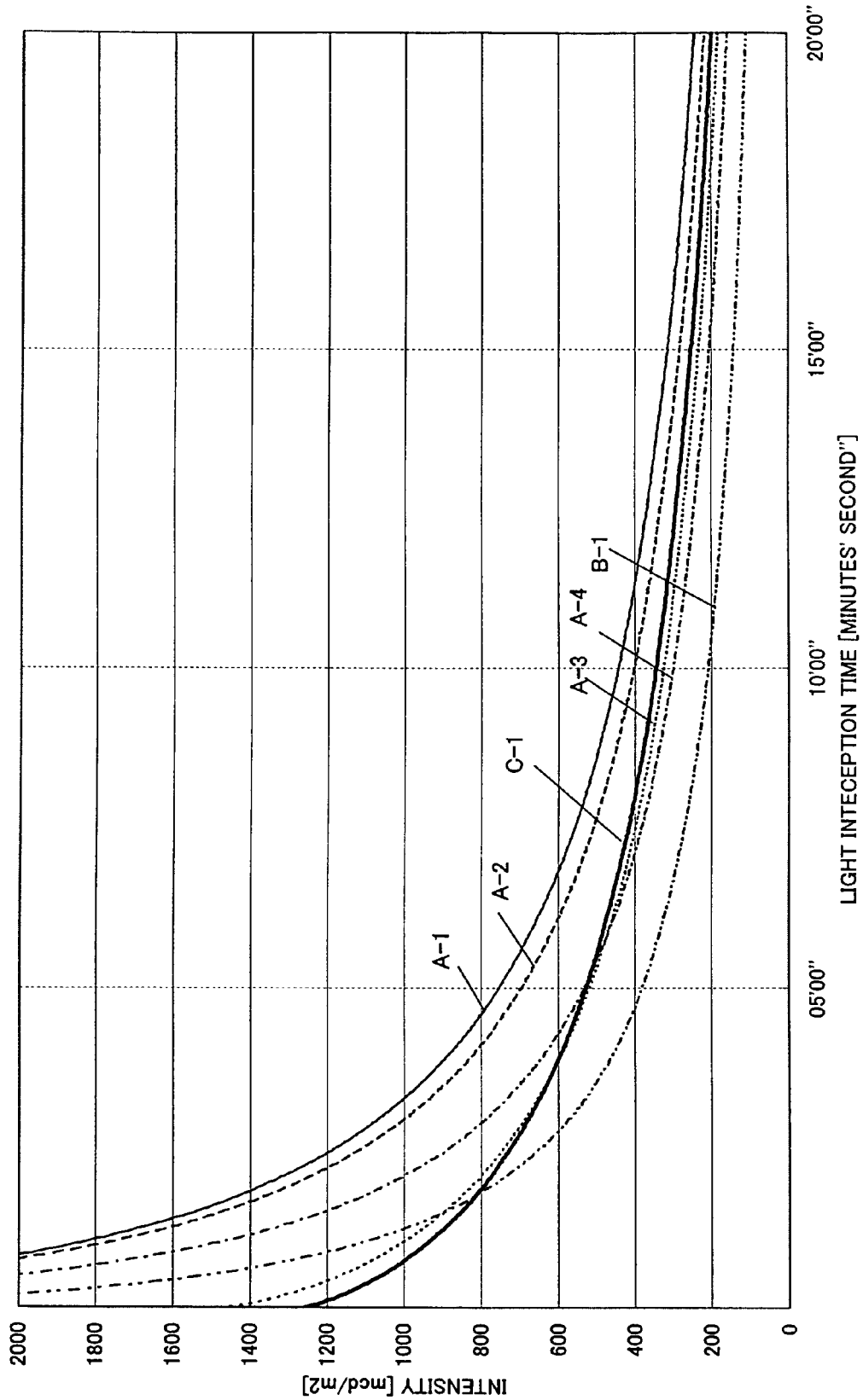
FIG. 1 is a graph representing actual measured values of afterglow intensity corresponding to a plurality of samples as light storing signs.

Light storing sign samples used in this embodiment are six (A-1, A-2, A-3, A-4, B-1, and C-1), and FIG. 1 shows afterglow intensity attenuation characteristics of respective measurement sections after the light interception. The afterglow intensity is set to a vertical axis and light interception time (minute) is set to a horizontal axis. The light storing sign samples A-1 to A-4 are resin plates on which the light storing material is applied, the light storing sign sample B-1 is also the resin plate on which the light storing material is applied like the samples A-1 to A-4, and the light storing sign sample C-1 is a ceramic plate on which the light storing material is applied.

Figure 2:
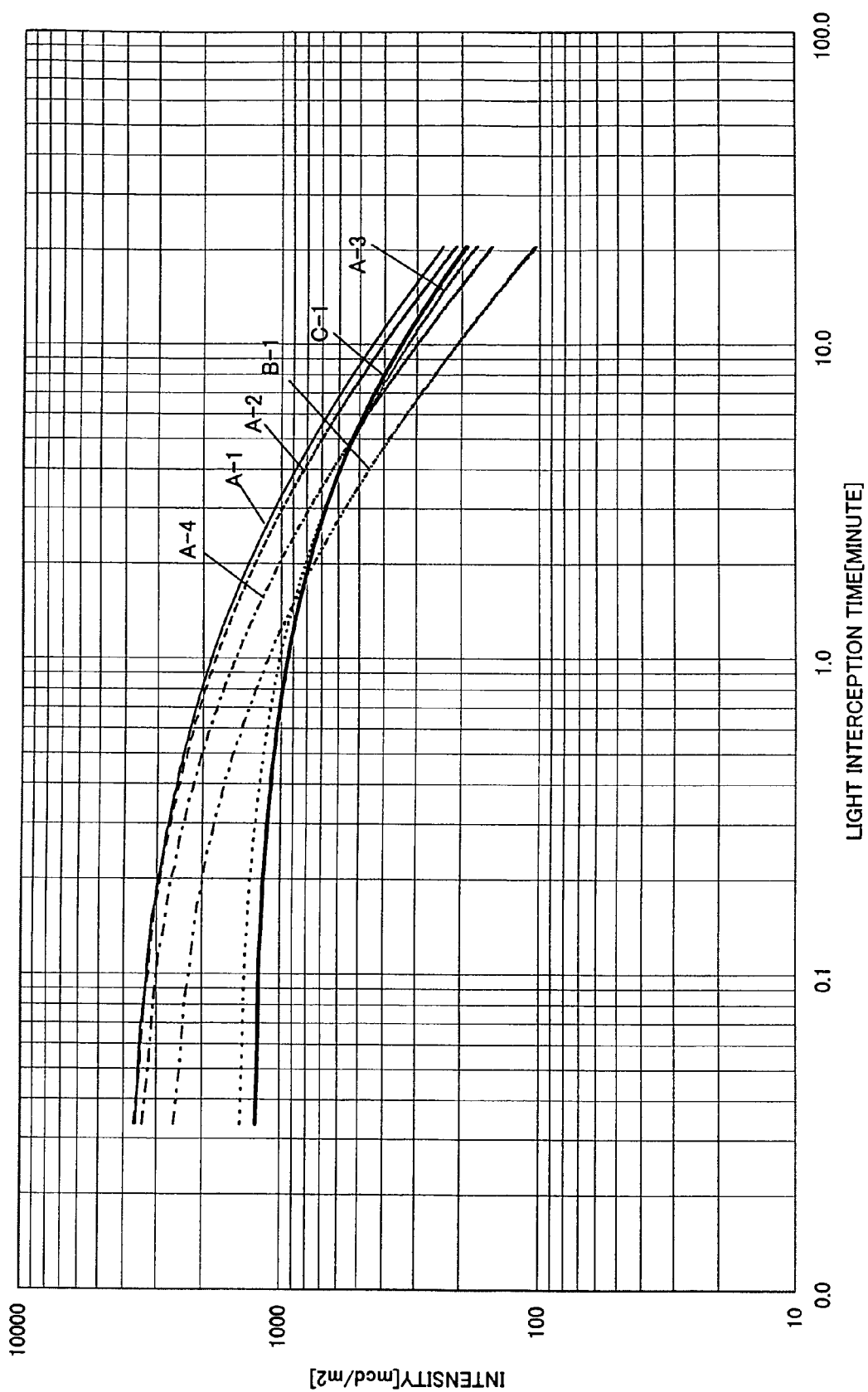
FIG. 2 is a graph representing logarithms of the actual measured values in FIG. 1.

FIG. 2 is a graph representing the same measurement result as in FIG. 1 by logarithm index. This kind of the light storing material is well known to show the exponential function attenuation characteristics as disclosed in Japanese laid-open Publication No. 07-11250A. Providing that the intensity has the exponential function attenuation characteristics, the afterglow intensity $L_{20}$ after 20 minutes from the light interception on a specific section of the light storing sign can be calculated by a following equation (1), using the intensity values measured for a predetermined period after the light interception, for example, from 3 minutes to 5 minutes after the light interception (because the values measured for 3 minutes after the light interception are considered as unstable data).

$$L_{20} = -a \log e^t + b \ (a: \text{coefficient}, b: \text{constant}) \tag{1}$$

However, when various light storing materials are applied on the light storing sign used in the embodiment (that is to say, the materials are applied thinly over the plate), it is possible to understand from FIG. 2 that the afterglow intensity does not show the exponential function attenuation characteristics. Table 1 shows the predicted afterglow intensity values after 20 minutes from the light interception on the specific section on the light storing sign, which are predicted (calculated) based on the measured intensity values from 3 minutes to 5 minutes from the light interception by means of the exponential function. The proportion of the predicted intensity values to the actual measured values indicates 50% to 80% deviation.

TABLE 1

Predicted intensity of light-energy storing samples after 20 min. from light interception, calculated using exponential function Result Predicted from intensity of samples measured from 3 min. to 5 min. after light interception

| Sample | Actual measured intensity after 20 min. from light interception [mcd/m2] | Predicted intensity after 20 min. from light interception [mcd/m2] | Proportion of predicted intensity to measured intensity after 20 min. from light interception [%] |
|---|---|---|---|
| Resin sample A-1 | 243.0 | 59.3 | −75.6 |
| Resin sample A-2 | 215.0 | 49.1 | −77.2 |
| Resin sample A-3 | 180.0 | 66.5 | −63.1 |
| Resin sample A-4 | 156.0 | 29.5 | −81.1 |
| Resin sample B-1 | 107.0 | 19.0 | −82.2 |
| Ceramic sample C-1 | 197.0 | 87.0 | −55.8 |
| Average (Ave.) | | | −72.5 |
| Standard deviation (S.D.) | | | 9.7 |

Figure 3:
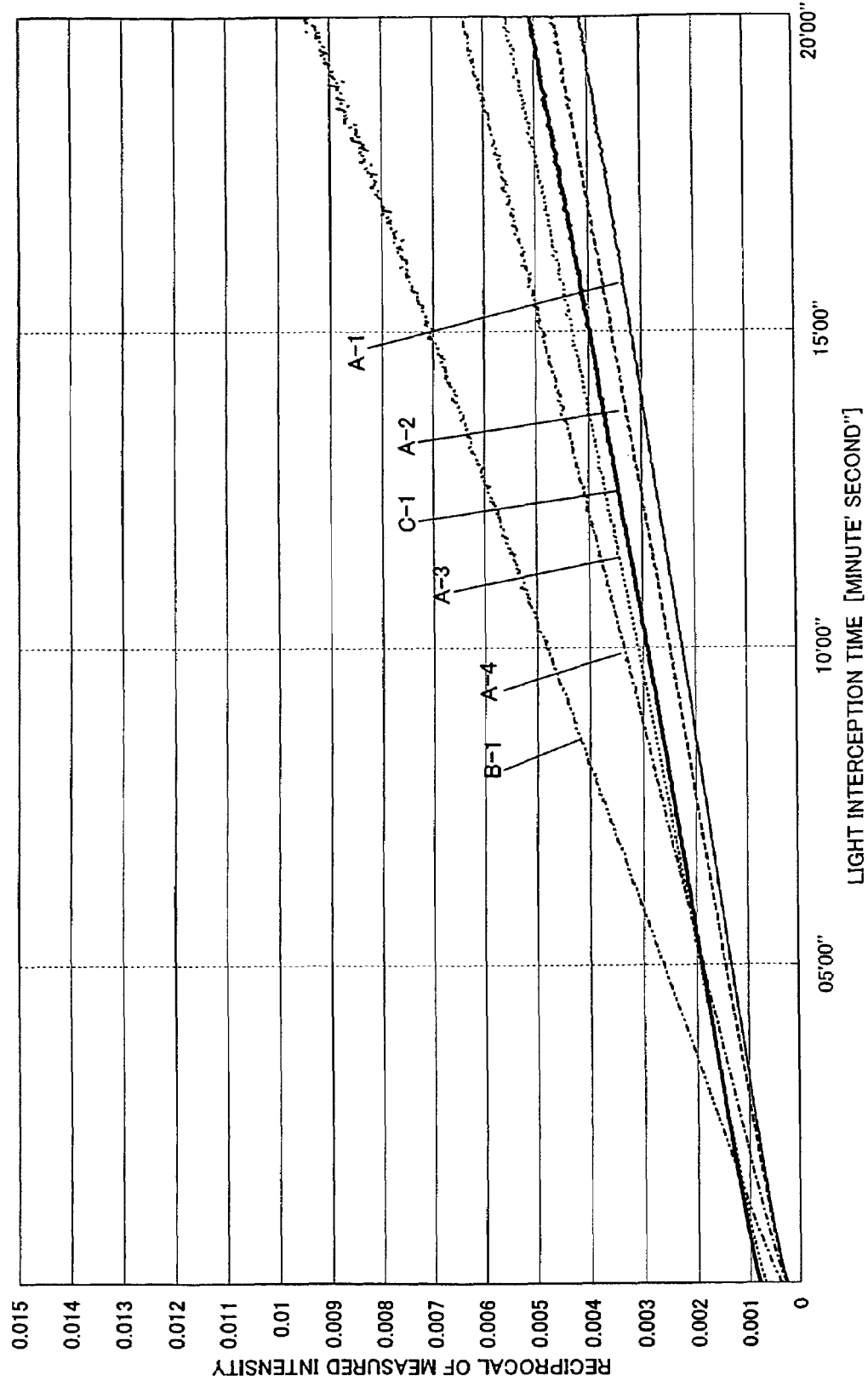
FIG. 3 is a graph representing reciprocals of the actual measured values in FIG. 1.

FIG. 3 is a graph representing reciprocals of the actual measured values for every sample. It is understood about every sample that the reciprocal of the measured value (the vertical axis) vs. the time (the horizontal axis) approximates a straight line (a linear expression). Therefore, the afterglow intensity at a time t after the light interception is expressed by the following linear equation (2).

$$L = \frac{1}{\alpha + \beta t} \tag{2}$$

$\alpha, \beta$: constant

When the predicted afterglow intensity after 20 minutes from the light interception is calculated by the above linear approximate equation based on the actual measured values from 3 minutes to 5 minutes after the light interception, Table 2 represents the actual measured intensity values, the predicted afterglow intensity values, and the deviation proportion (%) of both values. Since there is the time that cannot be approximated by the straight line just after the light interception, the data measured for 3 minutes just after the light interception is excluded. In result, there is a very little error between the calculated afterglow intensity after 20 minutes from the light interception and the actual measured intensity (−0.9% to +3.4%).

TABLE 2

Predicted intensity of light-energy storing sign samples after 20 min. from light interception, calculated using the reciprocal of measured intensity Result predicted from intensity of samples measured from 3 min. to 5 min. after light interception

| Sample | Actual measured intensity after 20 min. from light interception [mcd/m2] | Predicted intensity after 20 min. from light interception [mcd/m2] | Proportion of predicted intensity to measured intensity after 20 min. from light interception [%] |
|---|---|---|---|
| Resin sample A-1 | 243.0 | 240.7 | −0.9 |
| Resin sample A-2 | 215.0 | 216.9 | 0.9 |
| Resin sample A-3 | 180.0 | 186.3 | 3.5 |
| Resin sample A-4 | 156.0 | 158.2 | 1.4 |
| Resin sample B-1 | 107.0 | 111.1 | 3.8 |
| Ceramic sample C-1 | 197.0 | 203.7 | 3.4 |
| Average (Ave.) | | | 2.0 |
| Standard deviation (S.D.) | | | 1.7 |

When the sampling time varies, Table 3 represents the actual measured value after 20 minutes from the light interception, the deviation between the actual measured value and the predicted value, and the deviation percentage of both values. There are 6 cases of the sampling times between 'a sampling time from 2 minutes to 3 minutes after the light interception' and 'a sampling time from 3 minutes to 5 minutes after the light interception'. The deviation percentage of both values ranges within plus or minus several percentages. It proves no problem in practical use.

TABLE 3

Predicted intensity of light-energy storing sign samples after 20 min. from light interception, calculated using the reciprocal of measured intensity (calculation based on data at arbitrary time from 2 min. to 5 min. after light interception)

| | Sample | | | | | | | | |
|---|---|---|---|---|---|---|---|---|---|
| | Resin sample A-1 | | | Resin sample A-2 | | | Resin sample A-3 | | |
| | Intensity [mcd/m2] | Deviation [mcd/m2] | Proportion [%] | Intensity [mcd/m2] | Deviation [mcd/m2] | Proportion [%] | Intensity [mcd/m2] | Deviation [mcd/m2] | Proportion [%] |
| Measured intensity | 243 | | | 215 | | | 180 | | |
| Predicted intensity 1 | 232.4 | −10.6 | −4.4 | 210.1 | −4.9 | −2.3 | 182.7 | 2.7 | 1.5 |
| Predicted intensity 2 | 234.5 | −8.5 | −3.5 | 213.2 | −1.8 | −0.8 | 184.1 | 4.1 | 2.3 |
| Predicted intensity 3 | 235.9 | −7.1 | −2.9 | 213.6 | −1.4 | −0.7 | 185.2 | 5.2 | 2.9 |
| Predicted intensity 4 | 237.7 | −5.3 | −2.2 | 215 | 0.0 | 0.0 | 185.5 | 5.5 | 3.1 |
| Predicted intensity 5 | 240.4 | −2.6 | −1.1 | 216.7 | 1.7 | 0.8 | 187.5 | 7.5 | 4.2 |
| Predicted intensity 6 | 240.7 | −2.3 | −0.9 | 216.9 | 1.9 | 0.9 | 186.3 | 6.3 | 3.5 |

| | Sample | | | | | | | | |
|---|---|---|---|---|---|---|---|---|---|
| | Resin sample A-4 | | | Resin sample B-1 | | | Ceramic sample C-1 | | |
| | Intensity [mcd/m2] | Deviation [mcd/m2] | Proportion [%] | Intensity [mcd/m2] | Deviation [mcd/m2] | Proportion [%] | Intensity [mcd/m2] | Deviation [mcd/m2] | Proportion [%] |
| Measured intensity | 156 | | | 107 | | | 197 | | |
| Predicted intensity 1 | 155.6 | −0.4 | −0.3 | 110.3 | 3.3 | 3.1 | 197.9 | 0.9 | 0.5 |
| Predicted intensity 2 | 155.9 | −0.1 | −0.1 | 110.4 | 3.4 | 3.2 | 199.9 | 2.9 | 1.5 |

TABLE 3-continued

Predicted intensity of light-energy storing sign samples after 20 min. from light interception, calculated using the reciprocal of measured intensity (calculation based on data at arbitrary time from 2 min. to 5 min. after light interception)

| Predicted intensity 3 | 157.1 | 1.1 | 0.7 | 110.4 | 3.4 | 3.2 | 201.3 | 4.3 | 2.2 |
| Predicted intensity 4 | 157.4 | 1.4 | 0.9 | 110.8 | 3.8 | 3.6 | 202.1 | 5.1 | 2.6 |
| Predicted intensity 5 | 159.1 | 3.1 | 2.0 | 110.6 | 3.6 | 3.4 | 205.3 | 8.3 | 4.2 |
| Predicted intensity 6 | 158.2 | 2.2 | 1.4 | 111.1 | 4.1 | 3.8 | 203.7 | 6.7 | 3.4 |

Figure 4:
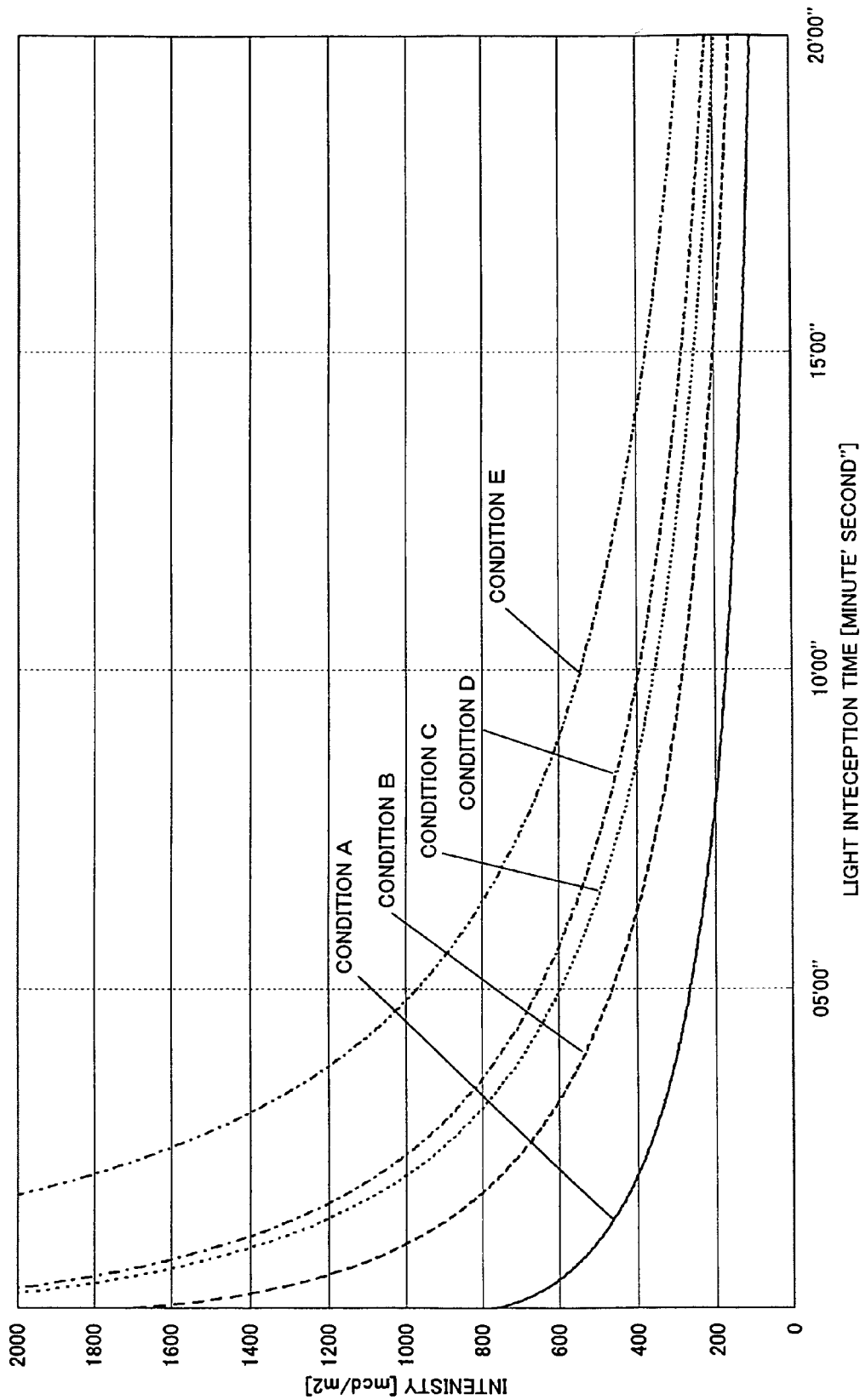
FIG. 4 is a graph representing actual measured values of afterglow intensity of which sampling conditions vary.

Deviation [mcd/m2]: Deviation between estimated intensity and measured intensity after 20 min. from light interception
Proportion[%]: Proportion of estimated intensity to measured intensity after 20 min. from light interception
Measured intensity: Afterglow intensity actually measured after 20 min. from light interception
Predicted intensity 1: Predicted intensity calculated based on data measured from 2 to 3 min.
Predicted intensity 2: Predicted intensity calculated based on data measured from 2 to 3.5 min.
Predicted intensity 3: Predicted intensity calculated based on data measured from 2 to 4 min.
Predicted intensity 4: Predicted intensity calculated based on data measured from 2 to 5 min.
Predicted intensity 5: Predicted intensity calculated based on data measured from 3 to 4 min.
Predicted intensity 6: Predicted intensity calculated based on data measured from 3 to 5 min.
Conditions:
(1) Light-energy storing condition: illuminance 200 lx for 1 hr.
(2) Calculation of estimated intensity using measurement data for every 30 sec.

Where the afterglow intensity of the sample A-1 is measured at different storing conditions of light energy, the measurement result is shown in FIG. 4. The light storing conditions are an illuminance time before the light interception and the illuminance intensity. The storing conditions are five cases, that is, illuminance 50 lux for 20 minutes (condition A), illuminance 80 lux for 20 minutes (Condition B), illuminance 100 lux for 20 minutes (condition C), illuminance 100 lux for 1 hour (Condition D), and illuminance 1000 lux for 1 hour (condition E).

Table 4 represents calculation results when the predicted afterglow intensity after 20 minutes are calculated based on the actual measured values shown in FIG. 4 using data measured for the period expressed in the left column of Table 4, and the calculation is based on the assumption that the attenuation approximates the exponential function. In each illiminance condition (conditions A to E), the predicted value becomes around minus 80% of the actual measured value. It proves that those values are not available in practical use.

Figure 5:
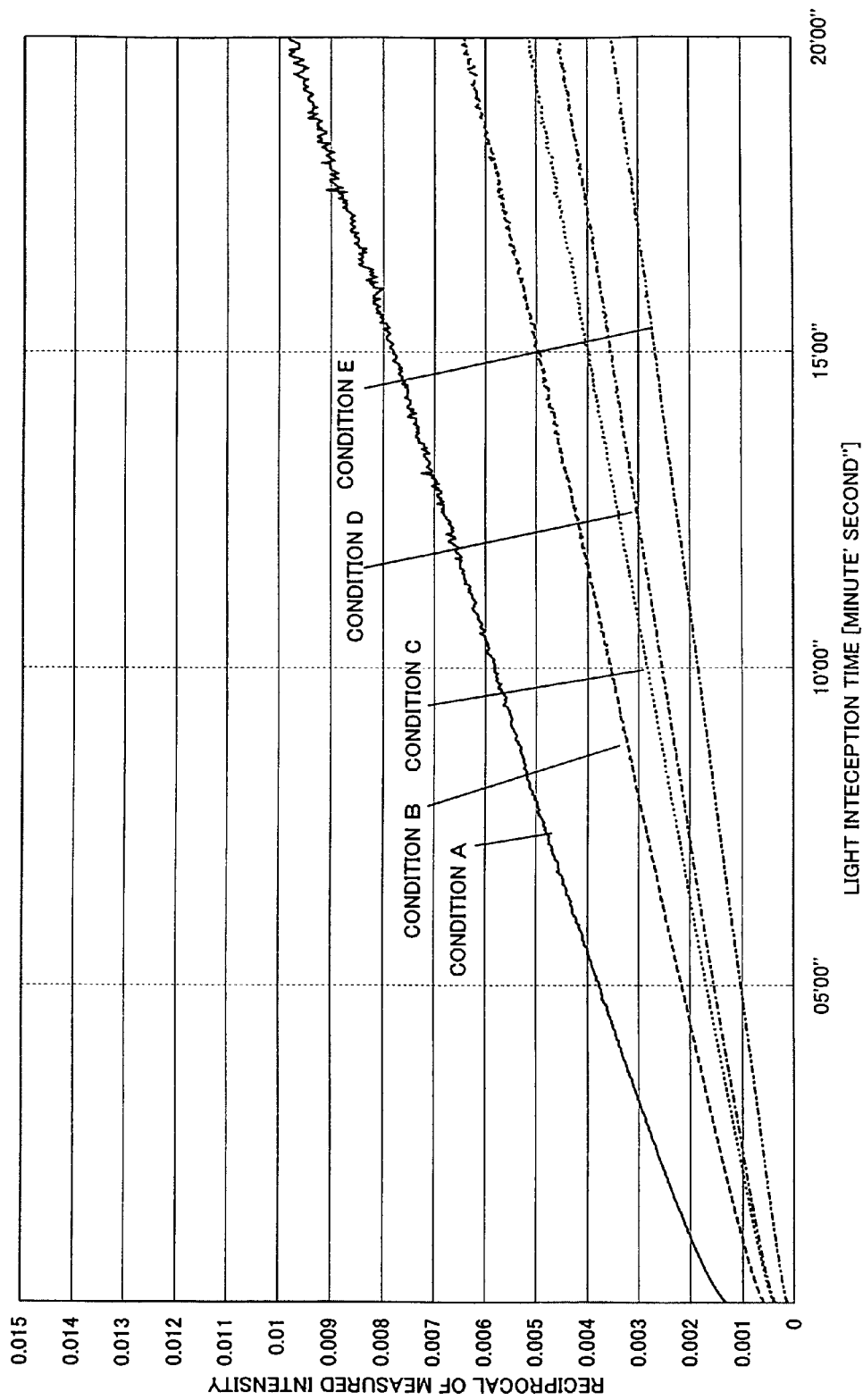
FIG. 5 is a graph representing reciprocals of the actual measured values in FIG. 4.

FIG. 5 represents the reciprocals of the actual measured vales in FIG. 4 in graphic form. Like FIG. 3, it can be understood that those values approximate the straight line (the linear equation) irrespective of the light storing conditions. When the predicted afterglow intensity after 20 minutes for the sample A-1 are calculated based on the reciprocals of the afterglow intensity measured during a specific period until a predetermined time has lapsed from beginning of the light interception, Table 5 represents the predicted values for every light storing condition. The specific period until the predetermined time has lapsed from the light interception is six types of conditions in the same way as Table 2. Regardless of the respective light storing conditions and the sampling times, the deviation percentage between the predicted value and the actual measured value rages within −5 to +1.8. It proves there is no problem in practical use.

TABLE 4

Predicted intensity of light-energy storing sign samples A-1 after 20 min. from light interception, calculated using exponential function, under different light-energy storing conditions (Calculation based on data at arbitrary time from 2 min. to 5 min. after light interception)

| | | Conditions | | | | | | | |
| --- | --- | --- | --- | --- | --- | --- | --- | --- | --- |
| | | Illuminance 50 lx for 20 min. | | | Illuminance 80 lx for 20 min. | | | Illuminance 100 lx for 20 min. | | |
| | | Intensity [mcd/m2] | Deviation [mcd/m2] | Proportion [%] | Intensity [mcd/m2] | Deviation [mcd/m2] | Proportion [%] | Intensity [mcd/m2] | Deviation [mcd/m2] | Proportion [%] |
| Measured intensity | 102 | | | 156 | | | 194 | | |
| Predicted intensity 1 | 21.3 | −80.7 | −79.1 | 20 | −136.0 | −87.2 | 21.7 | −172.3 | −88.8 |
| Predicted intensity 2 | 23 | −79.0 | −77.5 | 23.7 | −132.3 | −84.8 | 26 | −168.0 | −86.6 |
| Predicted intensity 3 | 25.1 | −76.9 | −75.4 | 38.5 | −117.5 | −75.3 | 29.5 | −164.5 | −84.8 |
| Predicted intensity 4 | 30.4 | −71.6 | −70.2 | 35 | −121.0 | −77.6 | 37.9 | −156.1 | −80.5 |
| Predicted intensity 5 | 30.3 | −71.7 | −70.3 | 38.5 | −117.5 | −75.3 | 40.8 | −153.2 | −79.0 |

TABLE 4-continued

Predicted intensity of light-energy storing sign samples A-1 after 20 min. from light interception, calculated using exponential function, under different light-energy storing conditions (Calculation based on data at arbitrary time from 2 min. to 5 min. after light interception)

| | | | | | | | | | |
|---|---|---|---|---|---|---|---|---|---|
| Predicted intensity 6 | 37.7 | −64.3 | −63.0 | 47.2 | −108.8 | −69.7 | 51.7 | −142.3 | −73.4 |

| | Conditions | | | | | | | | |
|---|---|---|---|---|---|---|---|---|---|
| | Illuminance 100 lx for 1 hr. | | | Illuminance 200 lx for 1 hr. | | | Illuminance 1000 lx for 1 hr. | | |
| | Intensity [mcd/m2] | Deviation [mcd/m2] | Proportion [%] | Intensity [mcd/m2] | Deviation [mcd/m2] | Proportion [%] | Intensity [mcd/m2] | Deviation [mcd/m2] | Proportion [%] |
| Measured intensity | 218 | | | 243 | | | 283 | | |
| Predicted intensity 1 | 24.8 | −193.2 | −88.6 | 19.4 | −223.6 | −92.0 | 14.8 | −268.2 | −94.8 |
| Predicted intensity 2 | 29.8 | −188.2 | −86.3 | 24.4 | −218.6 | −90.0 | 19.3 | −263.7 | −93.2 |
| Predicted intensity 3 | 34.4 | −183.6 | −84.2 | 29.4 | −213.6 | −87.9 | 23.4 | −259.6 | −91.7 |
| Predicted intensity 4 | 44.7 | −173.3 | −79.5 | 39.5 | −203.5 | −83.7 | 33.3 | −249.7 | −88.2 |
| Predicted intensity 5 | 48.8 | −169.2 | −77.6 | 47.7 | −195.3 | −80.4 | 39 | −244.0 | −86.2 |
| Predicted intensity 6 | 61.8 | −156.2 | −71.7 | 59.3 | −183.7 | −75.6 | 53.6 | −229.4 | −81.1 |

Deviation [mcd/m2]: Deviation between predicted intensity and measured intensity after 20 min. from light interception
Proportion[%]: Proportion of predicted intensity to measured intensity after 20 min. from light interception
Measured intensity: Afterglow intensity actually measured after 20 min. from light interception
Predicted intensity 1: Predicted intensity calculated based on data measured from 2 to 3 min.
Predicted intensity 2: Predicted intensity calculated based on data measured from 2 to 3.5 min.
Predicted intensity 3: Predicted intensity calculated based on data measured from 2 to 4 min.
Predicted intensity 4: Predicted intensity calculated based on data measured from 2 to 5 min.
Predicted intensity 5: Predicted intensity calculated based on data measured from 3 to 4 min.
Predicted intensity 6: Predicted intensity calculated based on data measured from 3 to 5 min.
The predicted intensity was calculated using data measured for every 30 sec.
1. Afterglow intensity test for light-energy storing type pilot sign: illuminance 200 lx for 1 hr.
2. Illuminance in underground passage: 200 lx and more (under an ordinance of Tokyo Fire Defense Agency)

TABLE 5

Predicted intensity of light-energy storing sign samples A-1 after 20 min. from light interception, calculated using the reciprocal of measured intensity, under different light-energy storing conditions (Calculation based on data at arbitrary time from 2 min. to 5 min. after light interception)

| | Conditions | | | | | | | | |
|---|---|---|---|---|---|---|---|---|---|
| | Illuminance 50 lx for 20 min. | | | Illuminance 80 lx for 20 min. | | | Illuminance 100 lx for 20 min. | | |
| | Intensity [mcd/m2] | Deviation [mcd/m2] | Proportion [%] | Intensity [mcd/m2] | Deviation [mcd/m2] | Proportion [%] | Intensity [mcd/m2] | Deviation [mcd/m2] | Proportion [%] |
| Measured intensity | 102 | | | 156 | | | 194 | | |
| Predicted intensity 1 | 96.7 | −5.3 | −5.2 | 152.7 | −3.3 | −2.1 | 193 | −1.0 | −0.5 |
| Predicted intensity 2 | 95.9 | −6.1 | −6.0 | 153.4 | −2.6 | −1.7 | 193.8 | −0.2 | −0.1 |
| Predicted intensity 3 | 96 | −6.0 | −5.9 | 154.1 | −1.9 | −1.2 | 193.2 | −0.8 | −0.4 |
| Predicted intensity 4 | 97.3 | −4.7 | −4.6 | 155.4 | −0.6 | −0.4 | 194.1 | 0.1 | 0.1 |
| Predicted intensity 5 | 95.5 | −6.5 | −6.4 | 155.7 | −0.3 | −0.2 | 192.5 | −1.5 | −0.8 |
| Predicted intensity 6 | 98.2 | −3.8 | −3.7 | 156.8 | 0.8 | 0.5 | 194.6 | 0.6 | 0.3 |

TABLE 5-continued

Predicted intensity of light-energy storing sign samples A-1 after 20 min. from light interception, calculated using the reciprocal of measured intensity, under different light-energy storing conditions (Calculation based on data at arbitrary time from 2 min. to 5 min. after light interception)

| | Conditions | | | | | | | | |
|---|---|---|---|---|---|---|---|---|---|
| | Illuminance 100 lx for 1 hr. | | | Illuminance 200 lx for 1 hr. | | | Illuminance 1000 lx for 1 hr. | | |
| | Intensity [mcd/m2] | Deviation [mcd/m2] | Proportion [%] | Intensity [mcd/m2] | Deviation [mcd/m2] | Proportion [%] | Intensity [mcd/m2] | Deviation [mcd/m2] | Proportion [%] |
| Measured intensity | 218 | | | 243 | | | 283 | | |
| Predicted intensity 1 | 210.7 | −7.3 | −3.3 | 232.4 | −10.6 | −4.4 | 285 | 2.0 | 0.7 |
| Predicted intensity 2 | 212.1 | −5.9 | −2.7 | 234.5 | −8.5 | −3.5 | 286.4 | 3.4 | 1.2 |
| Predicted intensity 3 | 212.6 | −5.4 | −2.5 | 235.9 | −7.1 | −2.9 | 285.5 | 2.5 | 0.9 |
| Predicted intensity 4 | 214.9 | −3.1 | −1.4 | 237.7 | −5.3 | −2.2 | 287.1 | 4.1 | 1.4 |
| Predicted intensity 5 | 214 | −4.0 | −1.8 | 240.4 | −2.6 | −1.1 | 285.5 | 2.5 | 0.9 |
| Predicted intensity 6 | 217 | −1.0 | −0.5 | 240.7 | −2.3 | −0.9 | 288.1 | 5.1 | 1.8 |

Deviation [mcd/m2]: Deviation between predicted intensity and measured intensity after 20 min. from light interception
Proportion[%]: Proportion of predicted intensity to measured intensity after 20 min. from light interception
Measured intensity: Afterglow intensity actually measured after 20 min. from light interception
Predicted intensity 1: Predicted intensity calculated based on data measured from 2 to 3 min.
Predicted intensity 2: Predicted intensity calculated based on data measured from 2 to 3.5 min.
Predicted intensity 3: Predicted intensity calculated based on data measured from 2 to 4 min.
Predicted intensity 4: Predicted intensity calculated based on data measured from 2 to 5 min.
Predicted intensity 5: Predicted intensity calculated based on data measured from 3 to 4 min.
Predicted intensity 6: Predicted intensity calculated based on data measured from 3 to 5 min.
The Predicted intensity was calculated using data measured for every 30 sec.
1. Afterglow intensity test for light-energy storing type pilot sign: illuminance 200 lx for 20 min.
2. Illuminance in underground passage: 200 lx and more (under an ordinance of Tokyo Fire Defense Agency)

TABLE 6

Influence of sampling time of measured data to be used to predicted intensity after 20 min. from light interception, calculated using the reciprocal of measured intensity
Case: Resin sample A-1

| | Sampling time | | | | | | | | |
|---|---|---|---|---|---|---|---|---|---|
| | Every 30 sec. | | | Every 15 sec. | | | Every 10 sec. | | |
| | Intensity [mcd/m2] | Deviation [mcd/m2] | Proportion [%] | Intensity [mcd/m2] | Deviation [mcd/m2] | Proportion [%] | Intensity [mcd/m2] | Deviation [mcd/m2] | Proportion [%] |
| Measured intensity | 243 | | | 243 | | | 243 | | |
| Predicted intensity 1 | 232.4 | −10.6 | −4.4 | 233 | −10.0 | −4.1 | 232 | −11.0 | −4.5 |
| Predicted intensity 2 | 235.9 | −7.1 | −2.9 | 235.9 | −7.1 | −2.9 | 235.7 | −7.3 | −3.0 |
| Predicted intensity 3 | 237.7 | −5.3 | −2.2 | 237.7 | −5.3 | −2.2 | 237.7 | −5.3 | −2.2 |
| Predicted intensity 4 | 240.4 | −2.6 | −1.1 | 240.4 | −2.6 | −1.1 | 239.4 | −3.6 | −1.5 |
| Predicted intensity 5 | 240.7 | −2.3 | −0.9 | 240.4 | −2.6 | −1.1 | 240 | −3.0 | −1.2 |

| | Sampling time | | | | | |
|---|---|---|---|---|---|---|
| | Every 5 sec. | | | Every 1 sec. | | |
| | Intensity [mcd/m2] | Deviation [mcd/m2] | Proportion [%] | Intensity [mcd/m2] | Deviation [mcd/m2] | Proportion [%] |
| Measured intensity | 243 | | | 243 | | |
| Predicted intensity 1 | 232.1 | −10.9 | −4.5 | 232.2 | −10.8 | −4.4 |
| Predicted intensity 2 | 235.8 | −7.2 | −3.0 | 235.7 | −7.3 | −3.0 |
| Predicted intensity 3 | 237.9 | −5.1 | −2.1 | 237.5 | −5.5 | −2.3 |

TABLE 6-continued

Influence of sampling time of measured data to be used to predicted intensity after 20 min.
from light interception, calculated using the reciprocal of measured intensity
Case: Resin sample A-1

|                      |       |      |      |       |      |      |
|----------------------|-------|------|------|-------|------|------|
| Predicted intensity 4 | 240.3 | −2.7 | −1.1 | 238.8 | −4.2 | −1.7 |
| Predicted intensity 5 | 240.6 | −2.4 | −1.0 | 239.6 | −3.4 | −1.4 |

Deviation [mcd/m2]: Deviation between predicted intensity and measured intensity after 20 min. from light interception
Proportion[%]: Proportion of predicted intensity to measured intensity after 20 min. from light interception
Measured intensity: Afterglow intensity actually measured after 20 min. from light interception
Predicted intensity 1: Predicted intensity calculated based on data measured from 2 to 3 min.
Predicted intensity 2: Predicted intensity calculated based on data measured from 2 to 4 min.
Predicted intensity 3: Predicted intensity calcualted based on data measured from 2 to 5 min.
Predicted intensity 4: Predicted intensity calculated based on data measured from 3 to 4 min.
Predicted intensity 5: Predicted intensity calcualted based on data measured from 3 to 5 min.
Light-energy storing condition: illuminance 200 lx for 1 hr.

Table 6 represents the calculation result of the afterglow intensity for the sample A-1 at different storing conditions of light energy, which is calculated based on the reciprocal of the afterglow intensity during the specific period until the predetermined time has lapsed from the light interception, in the same way as table 5. In the embodiment, the sampling intervals are 30 seconds, 15 seconds, 10 seconds, 5 seconds, and 1 second. It is obvious that the sampling interval does not affect the accuracy of the measurement.

Figure 6:
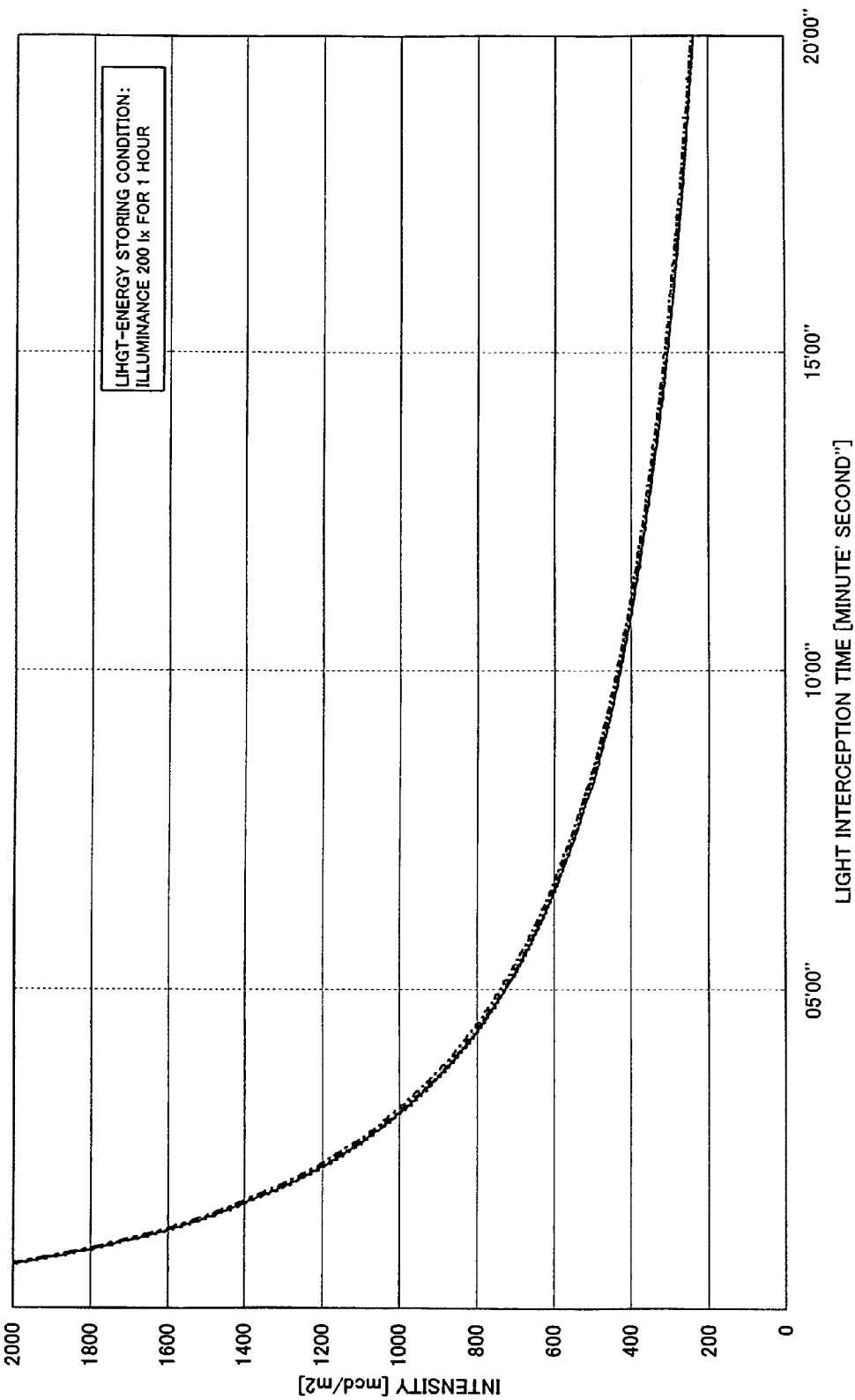
FIG. 6 is a graph representing actual measured values of afterglow intensity on different sections of the light storing sign.

FIG. 6 is a graph showing the attenuation of the afterglow intensity at positions P1 to P4 on the light storing sign shown in FIG. 7. The measured values at those four positions overlap each other and represent a same curve. It is understood that the afterglow intensity does not depend on the measurement position.

Figure 8:
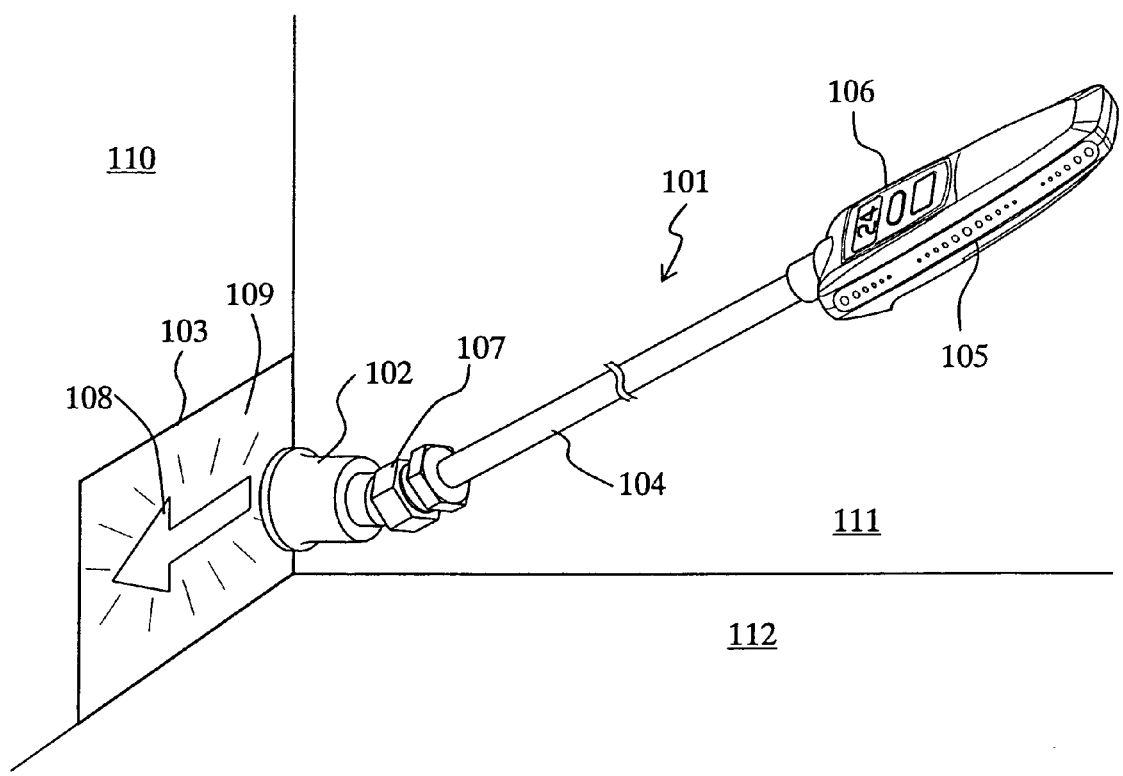
FIG. 8 is an external view of a stored light intensity measurement device of the invention.

FIG. 8 shows an example of an external view of the stored light intensity measurement device in the embodiment of this invention. The stored light intensity measurement device 101 is used bringing a light measurement unit 102 into intimate contact with the light storing sign 103. The stored light intensity measurement device 101 is provided with a shaft 104, a grip 105, a display unit 106, and a universal joint 107 in addition to the light measurement unit 102. The shaft 104 is provided at an end thereof with the grip 105. A user holds the stored light intensity measurement device 101 with the grip 105. The display unit 106 is disposed on an upper surface of the grip 105. The display unit 106 is provided with an indicator like the liquid crystal display, and displays the afterglow intensity of the light storing sign 103. Another end of the shaft 104 is provided with the universal joint 107. The universal joint 107 has a ball joint, and determines the position of the light measurement unit 102 at various angles, as well as connects the light measurement unit 102 with the shaft 104.

The storing light sign shown in FIG. 8 illustrates the light storing unit 103 in FIG. 7 more schematically, and has the colored section 108 and the light storing section 109 likewise. In this case, the arrow for the evacuation is the colored section 108, and the other area is the light storing section 109. When the light storing sign 103 is illuminated by an external light, the arrow can be recognized visibly by the colored section 108. When the environment surrounding the light storing sign 103 is dark, the arrow can be recognized by the afterglow of the light storing section 109. In FIG. 8, the light storing sign 103 is placed on a wall 110. The light storing sign 103 is at a position on which the wall 110 is adjacent to a wall 111 and a floor 112.

When the afterglow intensity of the light storing sign 103 is measured by the stored light intensity measurement device 101, the user supports the stored light intensity measurement device 101 by holding the grip 105, and presses the light measurement unit 102 against the light storing section 109 of the light storing sign 103. The light measurement unit 102 is brought into intimate contact with the light storing section 109, so that it is possible to shield a light measuring area from outside obstructive light, and this makes it possible to measure the afterglow of the light measuring area. Since the stored light intensity measurement device 101 is provided with the shaft 104 and the universal joint 107, even if the light storing sign 103 is disposed on the above-mentioned place, the user can perform the measurement without undue stress. Accordingly, the user can fix the light measurement unit 102 at ease for the time necessary to measure the afterglow intensity of the light storing sign 103. The display unit 106 is disposed on the grip 105, so that it easy for the user to recognize the afterglow intensity of the light storing sign 103.

Figure 9:
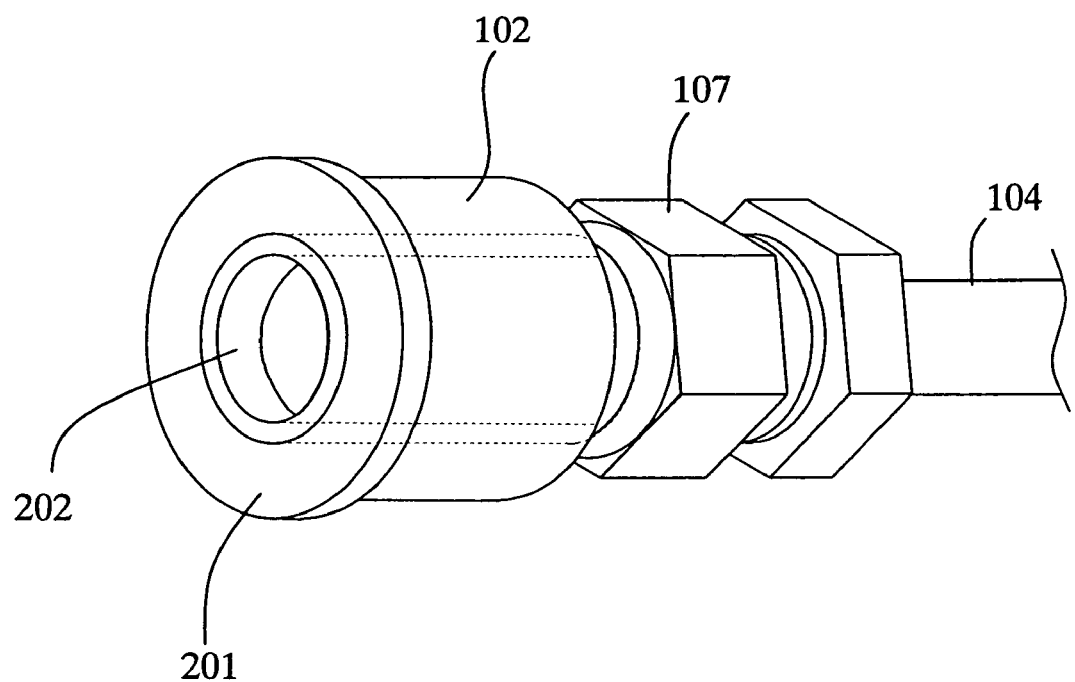
FIG. 9 is an enlarged view of an outer appearance of a light measurement unit.

FIG. 9 is an enlarged view of an example of the external view of the light measurement unit. The light measurement unit 102 is provided with a light intercepting part 201 and a light receiving part 202 on an intimate contacting surface to the light storing sign. The light intercepting part 201 uses a rubber elastic body. By pressing the light measurement unit 102 onto the light storing sign, the rubber elastic body is transformed, so that the light-tightness between the light intercepting part 201 and the light storing sign can be ensured. In this embodiment, the light intercepting part 201 forms the intimate contacting surface in torus form. The light receiving part 202 is disposed at a center of the contacting surface. The light receiving part 202 receives afterglow from the light storing sign. When the light intercepting part 201 is contacted light-tightly with the light storing sign, the light from the outside of the light intercepting part 201 is intercepted completely, so that the outside light does not reach on a measurement area of the light storing sign that is facing to the light receiving part 202. And the light intercepting part 201 intercepts the afterglow from the corresponding torus area on the light storing sign that contacts with the light intercepting part 201. Since the obstructive light interfering with the afterglow intensity measurement is intercepted by the light receiving part 202, the light receiving part 202 can receive the afterglow emitted from only the area corresponding to the part 202. By using the rubber elastic body, it is easy for the user to keep the light interception.

Figure 10:
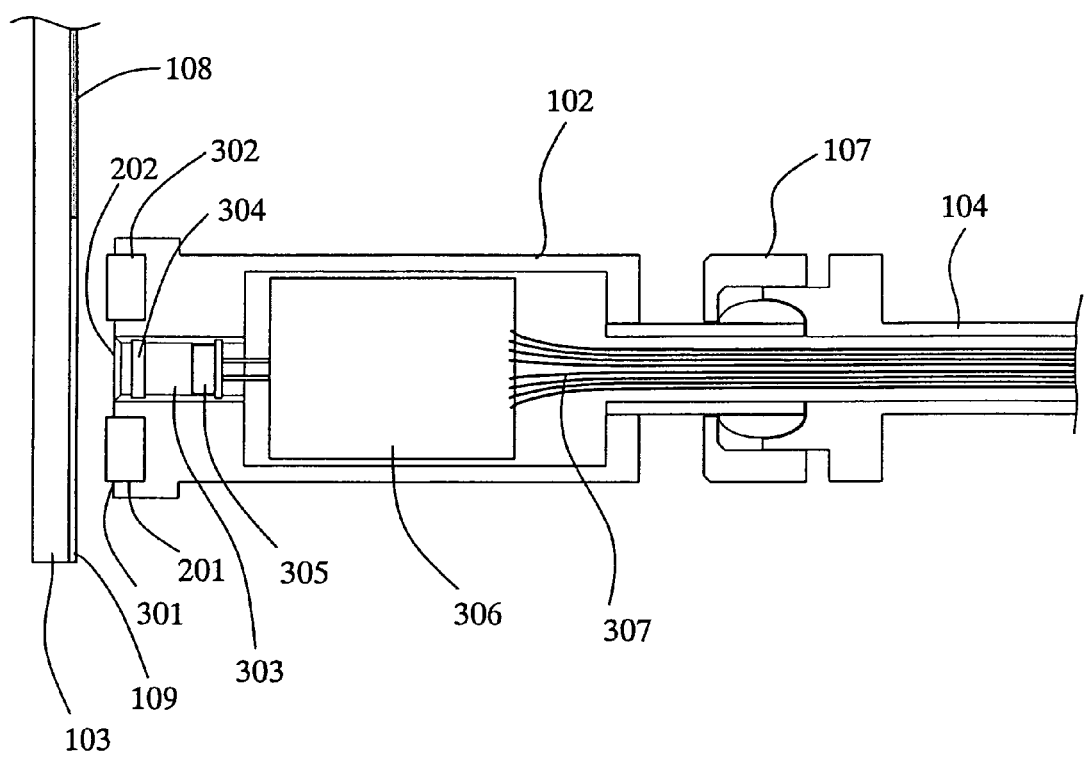
FIG. 10 is a sectional view of a light measurement unit.

FIG. 10 is a sectional view of an example of the light measurement unit. The light measurement unit 102 is provided with an approaching surface 301 that is smaller than the light storing section 109 of the light storing sign 103. When there is an obstruction around the light storing sign, the light measurement unit 102 cannot contact the light storing sign 103 due to the obstruction. In order to avoid such situation as far as possible, the approaching surface 301 is configured to be smaller than the light storing section 109 of the light storing sign 103. For instance, when the light storing sign 103 is placed on the riser of stairs, if the approaching surface 301 is larger than the light storing section, the light measurement unit is interfered with a step. In the place as shown in FIG. 8, the light measurement unit 102 is interfered with another wall or a floor. In order to measure the afterglow intensity of the light storing sign even in such place, the approaching surface 301 is formed in smaller than the light storing section 109 of the light storing sign 103. Since the whole surface of the light storing sign 103 is processed so as to get the uniform afterglow intensity, there is no problem even if the afterglow intensity is measured only on a part of the light storing section 109 of the light storing sign 103.

The light intercepting part 201 and the light receiving part 202 are placed on the contacting surface of the light measurement unit 102. In FIG. 10, the structure of the light intercepting part 201 is a little different from that in FIG. 9. In FIG. 10, a torus rubber elastic body 302 is provided to the approaching surface 301. The intimate contacting surface of the elastic body 302 projects from the approaching surface 301 slightly. According to such structure, when the light measurement unit 102 is pressed against the light storing sign 103, the elastic body 302 is transformed sufficiently, and it is possible to ensure the tightness between the light measurement unit 102 and the light storing sign 103 properly. Like an example shown in FIG. 9, the light receiving part 202 is provided at the center of the elastic body 302.

The light receiving part 202 is provided with an opening hole 303, and a guard window 304 is slightly deep inside the opening hole 303. And there is a light receiving element 305 at a bottom of the opening hole 303. The light receiving element 305 can use a photoelectric conversion element like a photodiode, and generates electric signals according to the incident light through the guard window 304. The output of the light receiving element 305 is given to a substrate 306. The substrate 306 generates digital data according to the analog electric signals from the light receiving element 305, and outputs the data to a signal line 307. The signal line 307 is installed in the universal joint 107 and the shaft 104, and connected to a signal processing unit in the grip. The digital data of the measurement result is transferred from the substrate 306 to the signal processing unit through the signal line 307.

Figure 11:
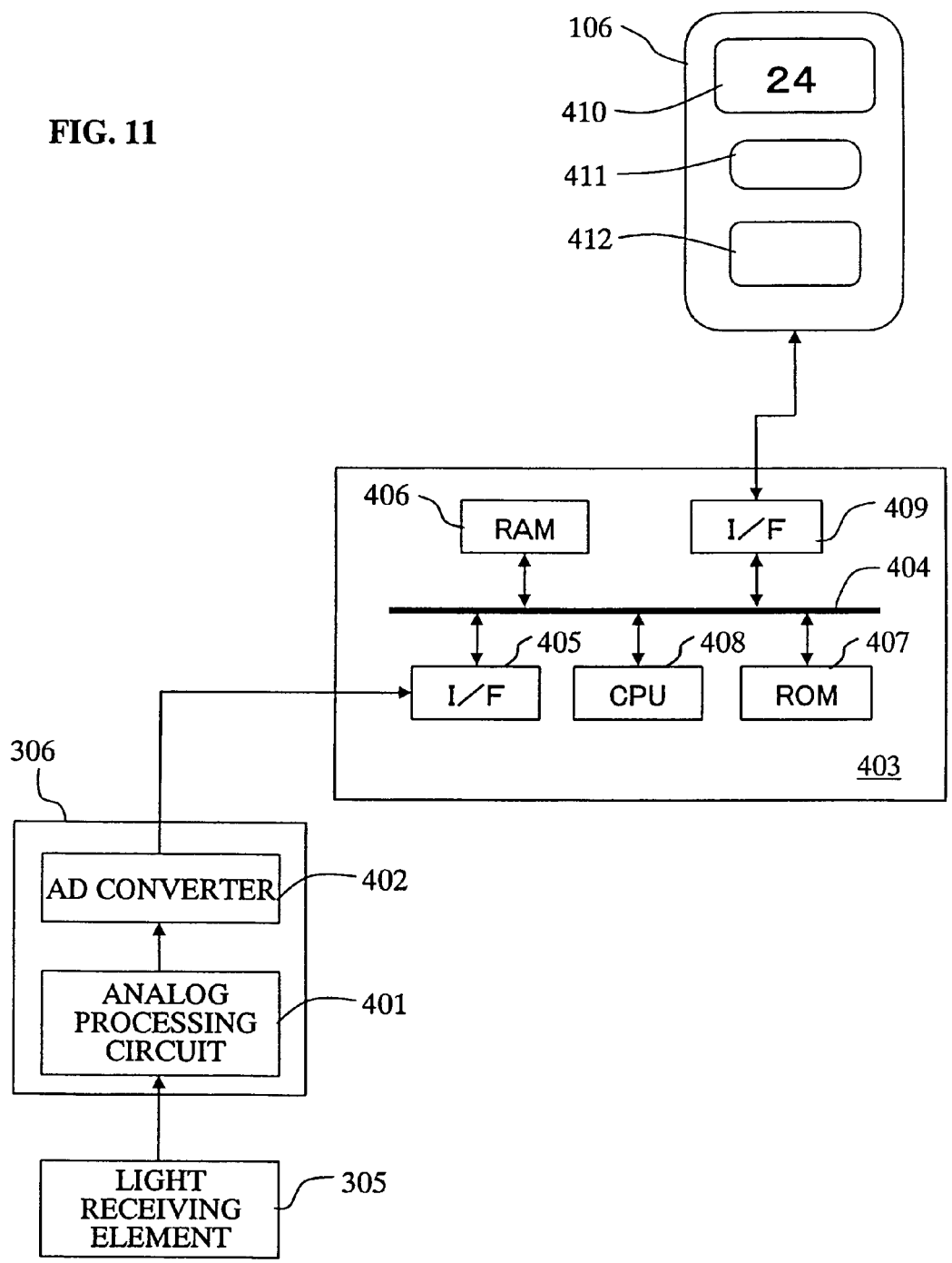
FIG. 11 is a diagram for explaining the outline of electric structure of the stored light intensity measurement device.

FIG. 11 is a diagram for schematically explaining an example of an electric structure of the stored light intensity measurement device. The light receiving element 305 receives the light from the light storing sign, and then outputs the analog electric signal to the substrate 306 according to the received light. The substrate 306 is provided with an analog processing unit 401, AD converter 402, and the like. The analog processing unit 401 amplifies the inputted analog electric signals, and performs the sampling-and-holding of the signals. The AD converter 402 converts the electric signals held for every sampling period to the digital data.

The output of the substrate 306 is connected to the signal processing unit 403. The signal processing unit 403 can use a special-purpose circuit or a general-purpose circuit. In this embodiment, the general-purpose circuit is used to the signal processing unit 403. The signal processing unit 403 is provided with a bus 404. The bus 404 is connected to an interface circuit 405 for the substrate 306. The signal processing unit 403 receives the digital data from the substrate 306 through the interface circuit 405. The bus 404 is connected to RAM 406, ROM 407, and CPU 408 as well as the interface circuit 405. RAM 406 can store the digital data received from the substrate 306. ROM 407 stores programs and setting data for the signal processing and the control. CPU 408 performs the calculation for the signal processing and the control according to instructions of the program. CPU 408 calculates the afterglow intensity of the light storing sign when a predetermined time lapsed after the measurement start, based on the data read from RAM 406.

The bus 404 is also connected to the interface circuit 409 for the display unit 106. The signal processing unit 403 in this embodiment controls the display unit 106 through the interface circuit 409. The display unit 106 is provided with operation buttons 411 and 412 in addition to an indictor 410 for displaying the measurement result. For instance, the operation button 411 is a menu selecting button, and the operation button 412 is an enter button. A user selects a menu item by the operation button 411, and then ensures the selection by the operation button 412. The menu items are an initialization, a calibration, and an execution of measurement. The calibration is for a case of measuring a reference plate of which afterglow intensity is known. When the user selects the execution of measurement and operates to enter the selection, the signal processing unit 403 fetches the digital data representing the measurement result into RAM 406. The digital data is sequentially stored in RAM 406 for every sampling period. After CPU 408 obtains necessary samples, it calculates the afterglow intensity of the light storing sign according to the sample values.

Figure 12:
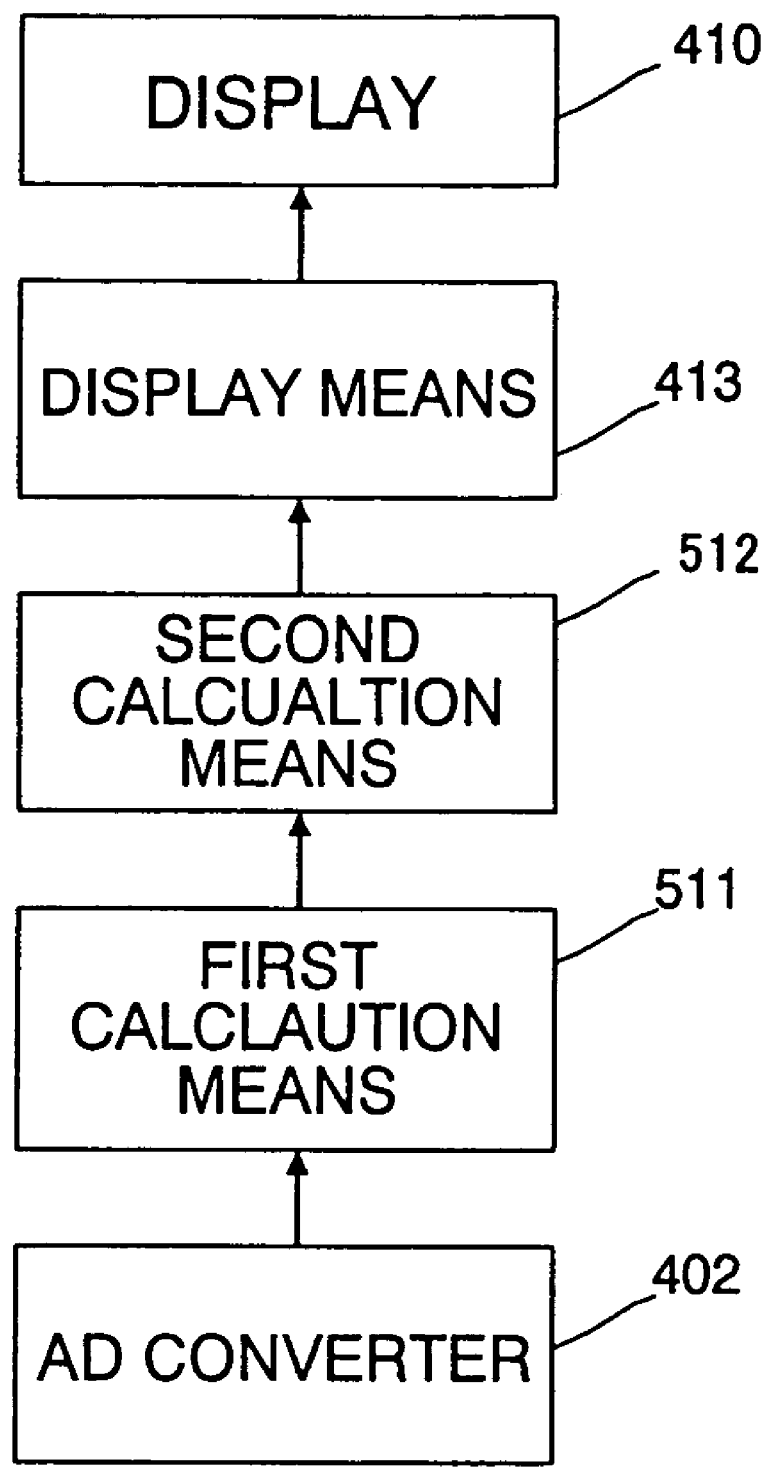
FIG. 12 is a functional block diagram of the present invention.

FIG. 12 is a functional block diagram when CPU 408 works together with the program stored in ROM 407. The data from the light receiving element 305 is sampled at specific intervals, and then converted to the digital data by the AD converter 402. The obtained digital data is stored in RAM 406 or a different storage means through the interface circuit 405.

A first calculation unit 511 finds the straight line (the linear approximate equation) corresponding to reciprocals of the afterglow intensity by means of the data between a first time and a second time after the specific time lapsed from the light interception, out of the sampling data being stored in RAM 406. That is to say, after the constants α and β of the equation (2) are found, the values are stored at a specific location of RAM 406. Then, a second calculation unit 512 calculates the afterglow intensity after the specific time t according to the above equation (2). It is obvious from Table 3 that the first time should be two or three minutes, and it is enough that the second time should be one or two minutes from the first time. In addition, the afterglow intensity to be calculated is the intensity after 20 minutes lapsed from the light interception. A display means 413 is also configured to calculate the afterglow intensity, and then display the calculated result on the indicator 410.

Therefore, the invention can measure the afterglow intensity of the light storing sign in a short time, and it can be used very effectively for the maintenance and investigation of the light storing sign.

The invention claimed is:
1. A stored light intensity measurement device comprising:
a light measurement unit configured to measure afterglow from a part of a light storing section on a light storing sign; and
calculation means for obtaining an approximate expression,

$$L = \frac{1}{\alpha + \beta t}, \alpha, \beta : \text{constants},$$

L:intensity, and t:time
based on the afterglow intensity measured from a first time t1 to a second time t2 after a beginning of the light interception, and predicting the afterglow intensity at an arbitrary time t3 after the beginning of the light interception using the approximate expression, wherein the time t1, t2, and t3 are t1<t2<t3, and a display means is used to display the afterglow intensity.

2. A stored light intensity measurement device according to claim 1, further comprising a light intercepting unit for intercepting obstructive light incident into the light measuring unit from an outside of a measurement area on the light storing sign.

3. A stored light intensity measurement device according to claim 1, further comprising:
the light measurement unit provided with an approaching surface smaller than a light storing section of the light storing sign,
a light receiver configured to receive light incident through a guard window of the light measurement unit; and
a light intercepting elastic body provided to the approaching surface so as to intercept light incident from the outside of a measuring area of the light storing sign by having intimate contact with the light storing sign,
wherein the calculation means calculates the afterglow intensity from the light storing sign base on the measured afterglow intensity when the light intercepting elastic body has intimate contact with the light storing sign.

4. A stored light intensity measurement device according to claim 3, further comprising:
a shaft having a grip; and
a universal join provided on an opposite end to the grip of the shaft to connect the light measurement unit.

5. A stored light intensity measurement device according to claim 3, further comprising: means for displaying the calculated afterglow intensity.

6. A stored light intensity measurement device according to claim 3, wherein an intimate contacting surface of the light intercepting elastic body projects from the approaching surface.

7. A stored light intensity measurement device according to claim 3, wherein the light intercepting elastic body has a torus intimate contacting surface, and the light receiving surface is placed at a center of the intimate contacting surface.

* * * * *